(12) United States Patent
Li et al.

(10) Patent No.: US 11,668,947 B2
(45) Date of Patent: Jun. 6, 2023

(54) LARGE-SPACING MULTI-CHANNEL WDM MODULE

(71) Applicants: Jinghui Li, Sierra Madre, CA (US); Qingming Zhang, Shenzhen (CN); Wen Lu, Shenzhen (CN); Yangjie Zheng, Shenzhen (CN)

(72) Inventors: Jinghui Li, Sierra Madre, CA (US); Qingming Zhang, Shenzhen (CN); Wen Lu, Shenzhen (CN); Yangjie Zheng, Shenzhen (CN)

(73) Assignee: Auxora (Shenzhen) Inc., Shenzhen (CN)

( * ) Notice: Subject to any disclaimer, the term of this patent is extended or adjusted under 35 U.S.C. 154(b) by 336 days.

(21) Appl. No.: 17/146,372

(22) Filed: Jan. 11, 2021

(65) Prior Publication Data
US 2022/0171208 A1    Jun. 2, 2022

(30) Foreign Application Priority Data

Nov. 30, 2020    (CN) .......................... 202011367128.3

(51) Int. Cl.
*G02B 27/14*    (2006.01)
*G02B 1/11*    (2015.01)

(52) U.S. Cl.
CPC .............. *G02B 27/142* (2013.01); *G02B 1/11* (2013.01)

(58) Field of Classification Search
CPC .... G02B 27/142; G02B 1/11; G02B 27/1006; G02B 6/2938; G02B 6/29367; G02B 6/293
See application file for complete search history.

(56) References Cited

FOREIGN PATENT DOCUMENTS

WO    WO2018008154    *    9/2018    ............. G02B 27/10

* cited by examiner

*Primary Examiner* — Joseph P Martinez

(57) ABSTRACT

Embodiment of present invention provide a wavelength division multiplexing (WDM) module. The WDM module includes a substrate having a first side and a second side opposing the first side, wherein the first side includes a transpassing region coated with an anti-reflective (AR) film and a reflective region coated with a high-reflective (HR) film, and the second side includes multiple ports of optical paths; multiple WDM filters attached to the multiple ports at the second side of the substrate, wherein surfaces of the WDM filters attached to the substrate are coated with WDM films; and at least one reflector attached to the second side of the substrate in a space between the multiple WDM filters, wherein the reflector has a first surface attached to the substrate and a second surface, opposing the first surface, that has a convex shape and coated with a high-reflective (HR) coating.

11 Claims, 4 Drawing Sheets

US 11,668,947 B2

1
LARGE-SPACING MULTI-CHANNEL WDM MODULE

CROSS REFERENCE TO RELATED APPLICATION

The present application claims benefit of priority to a Chinese patent application S/N: 202011367128.3, filed Nov. 30, 2020 with the China National Intellectual Property Administration, the content of which is incorporated herein by reference in its entirety.

FIELD OF THE INVENTION

The present application relates generally to the field of optical communication, and more particularly to a large-spacing multi-channel WDM module.

BACKGROUND

FIG. 1 is a simplified illustration of a WDM module as is currently known in the art. As in FIG. 1, a conventional multi-channel WDM module 100 generally includes a substrate 1. At a first side of substrate 1, there is a transpassing region 101 coated with AR (anti-reflective) film, and a reflective region 102 coated with HR (high-reflective) film. At a second side of substrate 1, multiple filters such as four filters 2a, 2b, 2c, and 2d are attached to substrate 1. Filters 2a, 2b, 2c, and 2d are generally coated with WDM (wavelength-division-multiplexing) films 201, which are then attached to a surface of the second side of substrate 1.

Filters 2a, 2b, 2c, and 2d represent four different optical channels or optical paths. The four channels are generally spaced apart to have a physical distance or spacing, and the distance or spacing d is usually around 0.75 mm to 1.1 mm. When WDM module 100 is used as a multiplexing device, an optical signal L3 collimated and launched into 4th filter 2d may pass through WDM film 201 of 4th filter 2d to propagate into substrate 1; arrive at the HR film of substrate 1 and get reflected the 1st time; arrive at the WDM film 201 of 3rd filter 2c and get reflected the 2nd time; arrive at the HR film of substrate 1 again and get reflected the 3rd time; arrive at the WDM film 201 of 2nd filter 2b and get reflected the 4th time; arrive at the HR film of substrate 1 again and get reflected the 5th time; arrive at the WDM film 201 of 1st filter 2a and get reflected the 6th time; and finally arrive at the AR film of substrate 1 and exit WDM module 100. Similarly, an optical signal L2 collimated and launched into 3rd filter 2c may pass through WDM film 201 of 3rd filter 2c into substrate 1; arrive at the HR film of substrate 1 and get reflected the 1st time; arrive at the WDM film 201 of 2nd filter 2b and get reflected the 2nd time; arrive at the FIR film of substrate 1 again and get reflected the 3rd time; arrive at the WDM film 201 of 1st filter 2a and get reflected the 4th time; and finally arrive at the AR film of substrate 1 and exit WDM module 100. Similarly, an optical signal L1 collimated and launched into 2nd filter 2b may pass through WDM film 201 of 2nd filter 2b into substrate 1; arrive at the HR film of substrate 1 and get reflected the 1st time; arrive at the WDM film 201 of 1st filter 2a and get reflected the 2nd time; and finally arrive at the AR film of substrate 1 and exit WDM module 100. Finally, an optical signal L0 collimated and launched into 1st filter 2a may pass through WDM film 201 of 1st filter 2a into substrate 1 and arrive at the AR film of substrate 1 and exit WDM module 100. Optical signals L0, 1, L2, and L3 are thereby combined into a WDM signal by WDM module 100.

2

However, in the above conventional WDM module, the physical distance or spacing d between neighboring optical paths are usually around 0.75 mm to 1.1 mm, which is considered as small and represents an insufficient spacing between the paths in order to conduct both effective and efficient coupling, usually through the use of optical lens, of optical signals L0, L1, L2, and L3 from their transmitting lasers into WDM filters 2a, 2b, 2c, and 2d. The small spacing may also cause transmitting lasers to become susceptible to interference coming from potential back-reflection of neighboring channels, which as a result affects overall stability of the transmitting lasers and associated system. Because of the above, a conventional WDM module is usually made with substrates having relatively thick thickness in order to increase the spacing, which competing with the demand for compact optical devices.

Recently, inventors of present invention surprisingly discovered that after being coated onto the base element of filters 2a, 2b, 2c, and 2d, WDM film 201 usually is bent to possess a convex shape, rather than a flat surface, due to film stress. When this convex shaped WDM film is used in the reflection of optical signals, coming in a direction from the substrate as described above, it causes the optical signals to diverge. In the above described situation, optical signals L0, L1, L2, and L3 may experience different number of reflections from WDM film 201 of different filters. Generally, the more number of reflections an optical signal experiences, such as with optical signal L2 or L3, the severer it becomes of the diverging impact on the quality of the optical signal. Consequently, degradation in coupling efficiency and/or difference in loss among different channels increases due to this increased divergence of optical signals.

SUMMARY

Embodiments of present invention provide a WDM (wavelength division multiplexing) module. The WDM module includes a substrate having a first side and a second side that opposes the first side, wherein the first side includes a transpassing region and a reflective region, the transpassing region is coated with an anti-reflective (AR) film and the reflective region is coated with a high-reflective (HR) film, and the second side includes multiple ports of optical paths.

The WDM module also includes multiple WDM filters attached to the multiple ports at the second side of the substrate, wherein surfaces of the WDM filters attached to the substrate are coated with WDM films of respective properties. The WDM module further includes at least one reflector attached to the second side of the substrate in a space between the multiple WDM filters, wherein the at least one reflector has a first surface attached to the substrate and a second surface that opposes the first surface, and wherein the second surface has a convex shape and is coated with a high-reflective (HR) film.

In one embodiment, the multiple WDM filters may include four WDM filters attached to four respective ports of four optical paths, and the at least one reflector may include three reflectors attached to the second side of the substrate between every two of the WDM filters.

In a further embodiment, the three reflectors may be placed substantially close to a central position between their two neighboring WDM filters, and may cause optical signals coming in a direction from the substrate to be substantially reflected back into the substrate, and the HR coating at the second surface causes the optical signal to converge.

In yet another embodiment, surfaces of the four WDM filters coated with WDM films have a convex shape that may be characterized by a radius of R1, and the convex shape of surfaces of the three reflectors coated with the HR film may be characterized by a radius of R2, and wherein R1 and R2 may satisfy a relationship of 0.60R1<=R2<=0.85R1.

According to one embodiment, the multiple ports of the optical paths are separated at the second side of the substrate by a spacing that is at least 1.5 mm. According to another embodiment, the convex shape of the second surface of the reflectors functionally works in a concave shape when optical signals are coming from the substrate and, with HR film at the second surface, the reflectors cause optical signals to be reflected back into the substrate with converging effect.

BRIEF DESCRIPTION OF THE DRAWINGS

The present invention will be understood and appreciated more fully from the following detailed description of embodiment of the invention, taken in conjunction with accompanying drawings of which.

Figure 1:
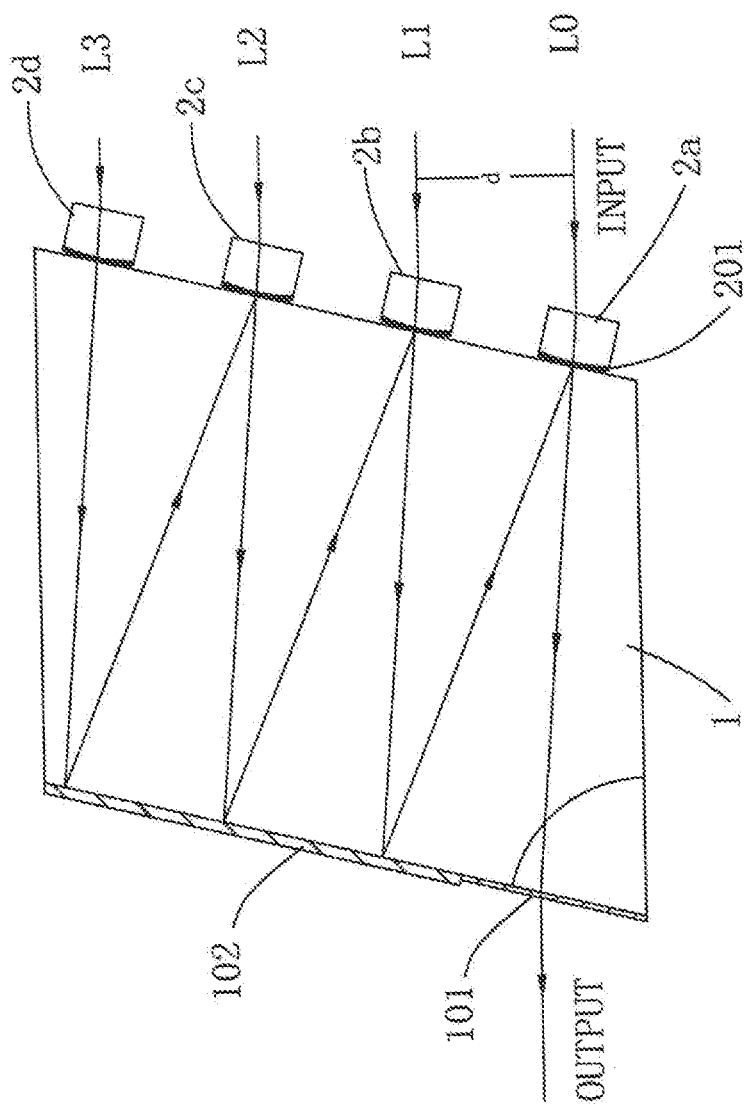
FIG. 1 is a simplified illustration of a WDM module as is currently known in the art.

It will be appreciated that for simplicity and clarity purpose, elements shown in the drawings have not necessarily been drawn to scale. Further, in various functional block diagrams, two connected devices and/or elements may not necessarily be illustrated to be connected. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENT

Figure 2:
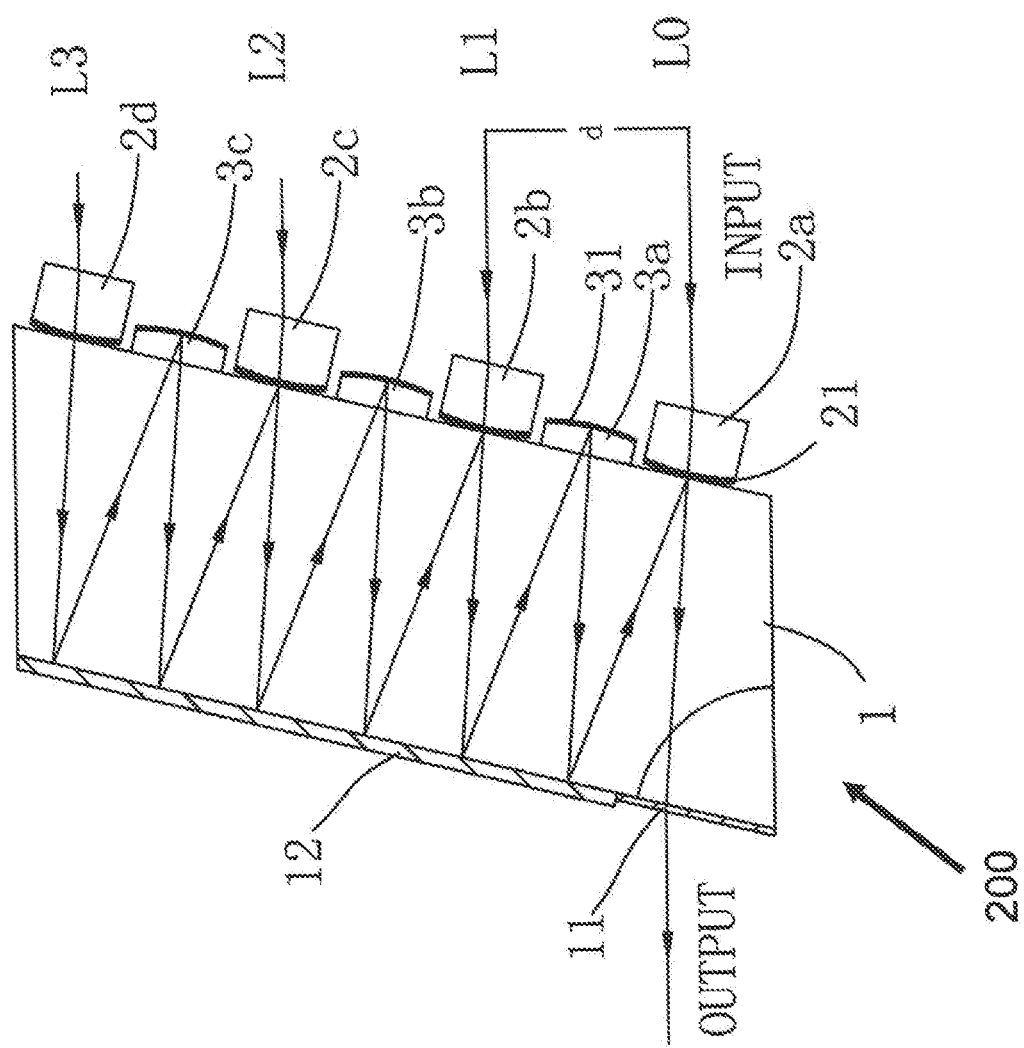
FIG. 2 is a demonstrative illustration of a large-spacing multi-channel WDM module according to one embodiment of present invention.

FIG. 2 is a demonstrative illustration of a large-spacing multi-channel WDM module or module assembly according to one embodiment of present invention. As in FIG. 2, WDM module 200 includes a substrate 1. At a first side of substrate 1, there is a transpassing region coated with AR film 11, and a reflective region coated with HR film 12. At a second side of substrate 1, multiple filters, such as four filters 2a, 2b, 2c, and 2d (which may be collectively referred to as filter 2) are attached to substrate 1. Filters 2a, 2b, 2c, and 2d may be coated with WDM films 21, which may ideally be flat but usually have some convex shape due to stress. WDM films 21 coated on filters 2a, 2b, 2c, and 2d may have different wavelength dependent properties that are designed to work for corresponding optical channels of different wavelengths. Filters 2a, 2b, 2c, and 2d, at their WDM films side, may be attached, such as through optical binding or the use of glue, to a surface of the second side of substrate 1.

According to one embodiment, one or more optical reflectors may be attached to the surface of the second side of substrate 1 and placed between two neighboring filters. For example, a 1st reflector 3a may be attached to substrate 1 and placed between 1st filter 2a and 2nd filter 2b; a 2nd reflector 3b may be attached to substrate 1 and placed between 2nd filter 2b and 3rd filter 2c; and a 3rd reflector 3c may be attached to substrate 1 and placed between 3rd filter 2c and 4th filter 2d. Reflectors 3a, 3b, and 3c may have a first surface that is substantially flat and attached, for example, through optical binding or use of glue to the surface of the second side of substrate 1.

Reflectors 3a, 3b, and 3c may have a second surface, opposing the first surface, that has a convex shape and is coated with a highly reflective HR film 31. As being described below in more details, the use of optical reflectors 3a, 3b, and 3c may help increase the physical distance or spacing between neighboring channels, which helps the coupling of optical signals from transmitting lasers to respective optical ports of WDM module 200; compensate the diverging effect of optical signals through its convex (concave to the optical signals) shaped HR film at the second surface; and reduce coupling loss difference among channels. Moreover, it improves uniformity of optical signals among different channels, reduces their spot sizes, and increases overall transportation efficiency.

According to one embodiment, WDM module 200 includes four optical channels although embodiments of present invention are not limited in this respects and more or less number of channels may be employed without deviating from the spirit of present invention. Reflectors 3a, 3b, and 3c are generally placed near or at the center or central position between respective filters 2a and 2b, 2b and 2c, and 2c and 2d. Distance between two neighboring channels d may generally be made to be equal to or larger than 1.5 mm, depending upon the application needs and corresponding design of WDM module 200, which is much larger than the 0.75 mm to 1.1 mm of a conventional WDM module. For example, channel distance or spacing may be made to be around 1.6 mm, 1.8 mm, or 2.2 mm.

WDM module 200 may be used in multiplexing or combining multiple optical signals of different wavelengths into a composite WDM signal in a direction, for example as is illustrated in FIG. 2, from the right side to the left side of WDM module 200. Alternatively, WDM module 200 may be used in de-multiplexing or separating a composite WDM signal into its composing multiple optical signals of different wavelengths in a direction, for example, from the left side to the right side of WDM module 200. As will be discussed below in more details, when working as a multiplexer in combining multiple optical signals into a composite WDM signal, the right side of WDM module 200 may provide multiple input ports, collectively marked "Input" in FIG. 2, and the left side of module 200 may provide an output port, marked "Output" in FIG. 2.

An optical signal L3 coming from a laser, collimated and launched into 4th filter 2d, may pass through WDM film 21 of 4th filter 2d to propagate into substrate 1; arrive at HR film 12 of substrate 1 and get reflected the 1st time; arrive at 3rd reflector 3c and get reflected the 2nd time; arrive at HR film 12 of substrate 1 again and get reflected the 3rd time; arrive at WDM film 21 of 3rd filter 2c and get reflected the 4nd time; arrive at HR film 12 of substrate 1 again and get reflected the 5th time; arrive at 2nd reflector 3b and get reflected the 6th time; arrive at FIR film 12 of substrate 1 again and get reflected the 7th time; arrive at WDM film 21 of 2nd filter 2b and get reflected the 8th time; arrive at HR film 12 of substrate 1 again and get reflected the 9th time; arrive at 1st reflector 3a and get reflected the 10th time; arrive at HR film 12 of substrate 1 again and get reflected the 11th time; arrive at WDM film 21 of 1st filter 2a and get reflected the 12th time; and finally arrive at AR film 11 of substrate 1 and exit WDM module 200.

Similarly, an optical signal L2 collimated and launched into 3rd filter 2c may pass through WDM film 21 of 3rd filter 2c into substrate 1; arrive at HR film 12 of substrate 1 and get reflected the 1st time; arrive at 2nd reflector 3b and get reflected the 2nd time; arrive at HR film 12 of substrate 1 again and get reflected the 3rd time; arrive at WDM film 21 of 2nd filter 2b and get reflected the 4th time; arrive at HR film 12 of substrate 1 again and get reflected the 5th time; arrive at 1st reflector 3a and get reflected the 6th time; arrive at HR film 12 of substrate 1 again and get reflected the 7th time; arrive at WDM film 21 of 1st filter 2a and get reflected the 8th time; and finally arrive at AR film 11 of substrate 1 and exit WDM module 200.

Similarly, an optical signal L1 collimated and launched into 2nd filter 2b may pass through WDM film 21 of 2nd filter 2b into substrate 1; arrive at HR film 12 of substrate 1 and get reflected the 1st time; arrive at 1st reflector 3a and get reflected the 2nd time; arrive at HR film 12 of substrate 1 again and get reflected the 3rd time; arrive at WDM film 21 of 1st filter 2a and get reflected the 4th time; and finally arrive at AR film 11 of substrate 1 and exit WDM module 200.

Finally, an optical signal L0 collimated and launched into 1st filter 2a may pass through WDM film 21 of 1st filter 2a into substrate 1 and arrive at AR film 11 of substrate 1 and exit WDM module 200.

By now, a person skilled in the art will appreciate that when operating in a reverse direction, from the left side to the right side, WDM module 200 may de-multiplex or split a composite WDM signal into four optical signals of different wavelengths that may exit WDM filters 2a, 2b, 2c, and 2d respectively. The de-multiplexing process may be described similarly to the above and thereby is not repeated here. Further, it is to be noted here that above process describes, as an example, four optical signals L0, L1, L2, and L3 of different wavelengths being multiplexed or combined into a composite WDM signal by WDM module 200. However, embodiments of present invention are not limited in this respect, and more or less optical signals, such as three optical signals L0, L1, and L3 in the absence of optical signal L2, may be used in the above multiplexing or de-multiplexing process as well. Furthermore, WDM module 200 may have more or less input/output ports other than what is illustrated in FIG. 2, and additional optical signals may be applied in the process.

In the above process, due the convex shape of WDM films 21, reflection from the WDM films 21 may cause optical signals to diverge, to certain degree. However, according to one embodiment of present invention, reflectors 3a, 3b, and 3c may compensate the diverging effect caused by WDM films 21 by converging the optical signals through the HR film on their second (right side in FIG. 2) surfaces of convex shape, which functionally works as a concave shape to the optical signals that come in a direction from the substrate and enter the first (left side in FIG. 2) surfaces of the reflectors to reach the HR film.

Figure 3:
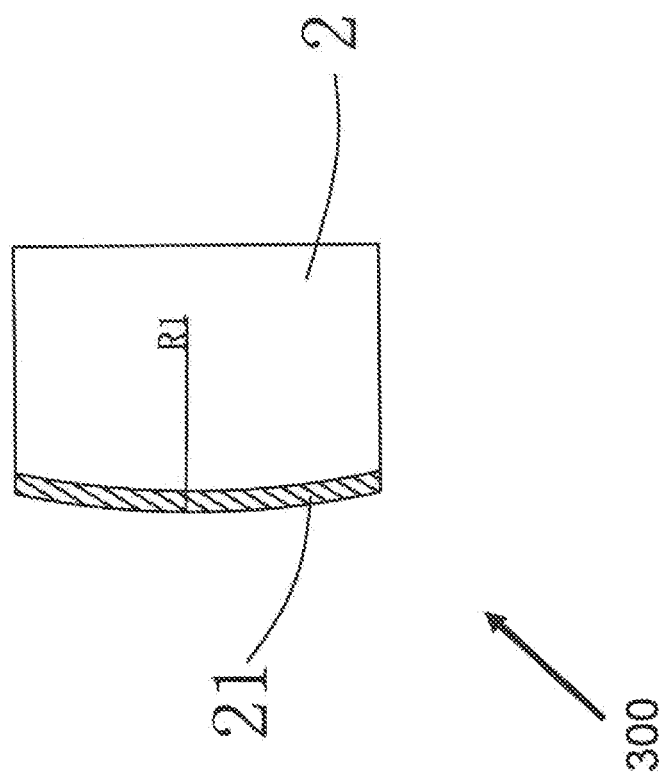
FIG. 3 is a demonstrative illustration of a filter used in the WDM module illustrated in FIG. 2 according to one embodiment.

FIG. 3 is a demonstrative illustration of a filter used in the WDM module illustrated in FIG. 2 according to one embodiment of present invention. As in FIG. 3, filter 300 may include a base element 2 upon which a WDM film 21 may be coated. For different filters, e.g., filters 2a, 2b, 2c, and 2d, WDM film 21 may have different optical filtering properties that correspond to wavelength-dependent functions of WDM filters 2a, 2b, 2c, and 2d. After being coated onto base element 2, WDM film 21 may bend slightly at the ends inward towards base element 2, possibly due to stress, to possess a convex shape as illustrated in FIG. 3. The convex shape of WDM film 21 may be characterized as a part of a sphere with a radius R1. In one embodiment, R1 may be around 300 mm. In another embodiment, R1 may be around 500 mm.

Figure 4:
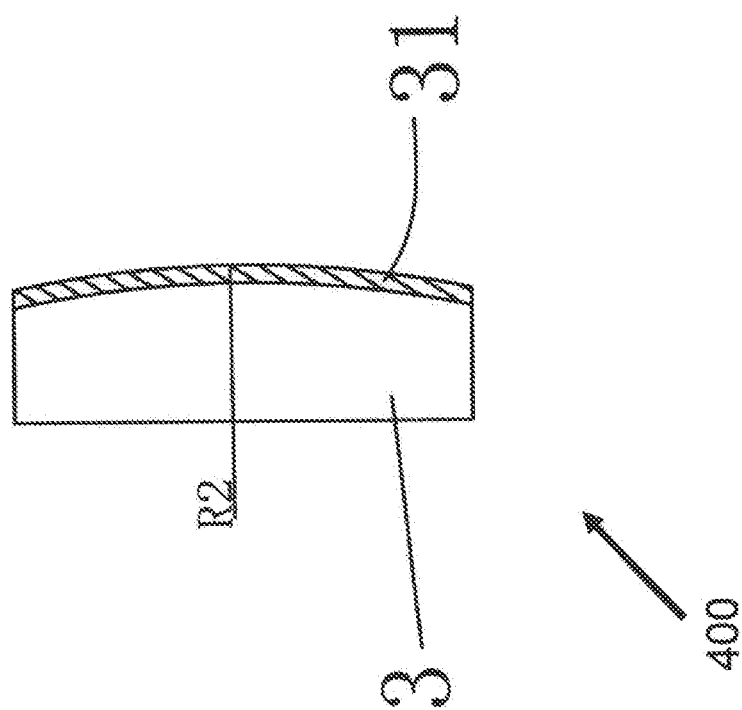
FIG. 4 is a demonstrative illustration of a reflector used in the WDM module illustrated in FIG. 2 according to one embodiment.

FIG. 4 is a demonstrative illustration of a reflector used in the WDM module illustrated in FIG. 2 according to one embodiment. As being illustrated in FIG. 4, reflector 400 may include a base element 3 coated with a highly reflective HR film 31. Base element 3 may have a first side having a substantially flat and polished surface, which is attached to the surface of the second side of substrate 1. Base element 3 may have a second side, opposing the first side, that is coated with the HR film 31. HR film 31 may be designed to bend gently at the ends inward towards base element 3 to form a convex shape, as illustrated in FIG. 4.

It is to be noted here that the convex shape of HR film 31 may function as a concave shape to an optical signal that comes to its left side through the first surface of the reflector. In other words, when looking via base element 3, HR film 31 may possess a concave shape. As being demonstratively illustrated in FIG. 2, optical signals may arrive at reflectors 3a, 3b, and 3c from substrate 1 to reach HR films 31 through base element 3. In this case, HR films 31 may function as a concave reflective surface to these optical signals. This concave reflective surface may provide some converging effect to the optical signals, thereby compensating, at least partially, the diverging effect caused by WDM films 21 during the multiple reflection process.

The convex shape of HR film 31 may be characterized as a part of a sphere with a radius R2. Compared with R1 of the convex shape of WDM film 21, in one embodiment, R1 and R2 may preferably satisfy a relationship of $0.6R1 \leq R2 \leq 0.85R1$. For example, when R1 equals 300 mm, R2 may preferably be between 180 mm and 255 mm.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A WDM (wavelength division multiplexing) module comprising:

a substrate having a first side and a second side opposing the first side, wherein the first side includes a transpassing region and a reflective region, the transpassing region is coated with an anti-reflective (AR) film and the reflective region is coated with a high-reflective (HR) film, and the second side includes multiple ports of optical paths;

multiple WDM filters attached to the multiple ports at the second side of the substrate, wherein surfaces of the WDM filters attached to the substrate are coated with WDM films of respective properties; and at least one reflector attached to the second side of the substrate in a space between the multiple WDM filters, wherein the at least one reflector has a first surface that is attached to the substrate and a second surface that opposes the first surface, and wherein the second surface has a convex shape and is coated with a high-reflective (HR) film, wherein the multiple WDM filters include four WDM filters attached to four respective ports of four optical paths, and the at least one reflector comprises three reflectors attached to the second side of the substrate between every two of the four WDM filters and wherein surfaces of the four WDM filters coated with WDM films have a convex shape that is characterized by a radius of R1, the convex shape of surfaces of the three reflectors coated with the HR film is characterized by a radius of R2, and wherein R1 and R2 satisfy a relationship of 0.60R1<=R2<=0.85R1.

2. The WDM module of claim 1, wherein the three reflectors are placed substantially close to a central position between their two neighboring WDM filters, and cause optical signals coming in a direction from the substrate to be substantially reflected back into the substrate with converging effect.

3. The WDM module of claim 1, wherein the multiple ports of the optical paths are separated at the second side of the substrate by a spacing that is at least 1.5 mm.

4. The WDM module of claim 1, wherein, with respect to an optical signal coming in a direction from the substrate, the convex shape of the second surface of the at least one reflector functionally presents itself as a concave shape and, with HR film at the second surface, the at least one reflector causes the optical signal to be reflected back into the substrate with converging effect.

5. A WDM (wavelength division multiplexing) module comprising:
   a substrate, the substrate has a first side that includes a transpassing region coated with an anti-reflective (AR) film and a reflective region coated with a high-reflective (HR) film, and has a second side that includes four ports of four optical channels;
   four WDM filters attached to the four ports at the second side of the substrate, wherein surfaces of the WDM filters attached to the substrate are coated with WDM films; and
   three reflectors attached to the second side of the substrate in spaces between the four WDM filters, wherein the three reflectors have a first surface that is attached to the substrate and a second surface that opposes the first surface; and the second surface has a convex shape and is coated with a high-reflective (HR) film,
   wherein the convex shape of the second surface of the three reflectors functionally works as a concave shape, coated with the HR film, with respect to an optical signal that comes from the substrate to enter the three reflectors via its first surface that opposes the second surface, the three reflectors thereby causing the optical signal to be reflected back into the substrate and to converge respectively, and wherein surfaces of the four WDM filters coated with WDM films have a convex shape that is characterized by a radius of R1, wherein R1 is equal to or larger than 300 mm.

6. The WDM module of claim 5, wherein surfaces of the four WDM filters coated with WDM films have a convex shape that is characterized by a radius of R1, the convex shape of surfaces of the three reflectors coated with the HR film is characterized by a radius of R2, and wherein R1 and R2 satisfy a relationship of 0.60R1<=R2<=0.85R1.

7. The WDM module of claim 5, wherein the convex shape of surfaces of the three reflectors coated with the HR film is characterized by a radius of R2, wherein R2 ranges from 180 mm to 255 mm.

8. The WDM module of claim 5, wherein the four ports of optical channels at the second side of the substrate are separated by a spacing that is 1.5 mm, 1.6 mm, 1.8 mm, or 2.2 mm.

9. A WDM (wavelength division multiplexing) module comprising:
   a substrate, the substrate has a first side that includes a transpassing region coated with an anti-reflective (AR) film and a reflective region coated with a high-reflective (HR) film, and has a second side that includes four ports of four optical channels;
   four WDM filters attached to the four ports at the second side of the substrate, wherein surfaces of the four WDM filters attached to the substrate are coated with WDM films of different properties, and have a convex shape that is characterized by a radius of R1; and
   three reflectors attached to the second side of the substrate in spaces between the four WDM filters, wherein the three reflectors have a first surface attached to the substrate and a second surface that opposes the first surface, the second surface has a convex shape coated with the HR film, and the convex shape of the second surface of the three reflectors is characterized by a radius R2, and wherein R1 and R2 satisfy a relationship of 0.60R1<=R2<=0.85R1,
   wherein with respect to an optical signal coming from the substrate that enters the three reflectors via its first surface that opposes the second surface, the convex shape of the second surface of the three reflectors functionally works as a concave shape and, together with the coated HR film, the three reflectors cause the optical signal to be reflected back into the substrate with converging effect.

10. The WDM module of claim 9, wherein R1 is equal to or larger than 300 mm and R2 is between about 180 mm and about 255 mm.

11. The WDM module of claim 9, wherein the four ports of optical channels at the second side of the substrate are separated by a spacing, and the spacing approximately equals to 1.5 mm, 1.6 mm, 1.8 mm, or 2.2 mm.

* * * * *